May 19, 1959   F. L. LE BUS, SR   2,887,161
COMBINED FISHING TOOL AND REAMING APPARATUS
Filed Oct. 20, 1954   3 Sheets-Sheet 2

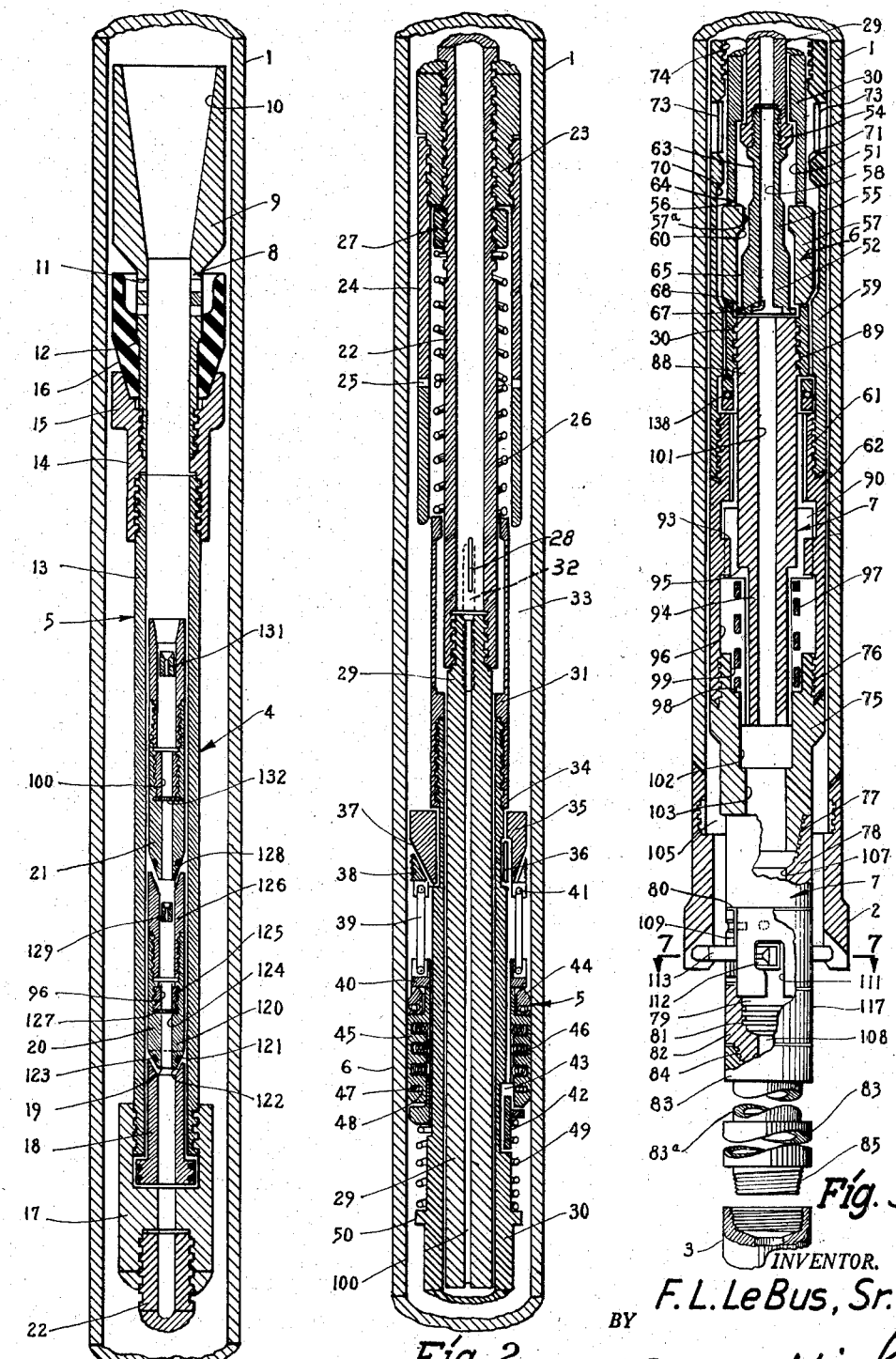

INVENTOR.
F. L. LeBus, Sr.
BY
ATTORNEY

May 19, 1959 F. L. LE BUS, SR 2,887,161
COMBINED FISHING TOOL AND REAMING APPARATUS
Filed Oct. 20, 1954 3 Sheets-Sheet 3

INVENTOR.
F. L. LeBus, Sr.
BY
ATTORNEY

United States Patent Office 2,887,161
Patented May 19, 1959

2,887,161

COMBINED FISHING TOOL AND REAMING APPARATUS

Franklin L. Le Bus, Sr., Longview, Tex., assignor to The Wash Overshot and Spear Engineers Incorporated, Longview, Tex., a corporation of Texas Application October 20, 1954, Serial No. 463,554

13 Claims. (Cl. 166—103)

This invention relates to improvements in drill collar retrieving apparatuses, and more particularly, but not by way of limitation, to improvements in the type of drill collar retrieving apparatuses which simultaneously hold and dislodge stuck drill collars. This invention is an improvement over applicant's copending application 405,186 filed January 20, 1954.

The present invention contemplates a novel drill collar retrieving apparatus adapted to recover the lodged drill bit and collars in one trip of tools in the well bore without damaging the drill bit or collars. The retrieving apparatus is carried in the wash-over string and engages the uppermost drill collar as the wash-over pipe is initially telescoped over the drill collars. A reamer on the wash-over pipe frees the drill bit and collars, and during the entire reaming operation, the drill collars are engaged by the retrieving device. Therefore, when the drill bit is dislodged, the drill collars and bit will be prevented from dropping to the bottom of the well bore. Subsequently, the wash-over string, with the drill bit and collars attached, may be removed from the well bore. Furthermore, the present invention contemplates a holding mechanism between the outer sleeve of the coupling unit, and the retrieving apparatus to assure that there will be a positive connection therebetween until the retrieving apparatus is engaged with the drill collar to be retrieved, thereby precluding any possibility of accidental disengagement of the retrieving apparatus from the coupling unit prior to a positive connection by the whole retrieving apparatus with the lost drill collar. In addition, the present apparatus contemplates preclusion of any reaming action by the reaming shoe until positive engagement of the retrieving apparatus with the lost drill collar.

In the event the drill bit and collars cannot be removed, or it is not desired to remove them, the drill collars may be gently lowered to rest on the bottom of the well bore and the retrieving apparatus may be separated by circulating fluid or drilling mud pressure. The wash-over string may then be removed from the well bore, leaving the drill collars, bit, and a portion of the retrieving apparatus in the bottom of the well bore. At a later time, the drill collars and bit may be recovered from the bottom of the well bore by other suitable tools.

An important object of this invention is to ream around lodged drill collars in a well bore while simultaneously holding the drill collars from downward movement.

Another object of this invention is to provide means for reaming out key-seats lodging drill collars in a well bore and preventing downward movement of the drill collars when they become dislodged.

Another object of this invention is to provide a mechanism for dislodging and recovering lodged drill collars in one operation of running tools in the well bore.

A further object of this invention is to provide a drill collar retrieving mechanism in a wash-over pipe which may be disconnected by hydraulic pressure.

Another object of this invention is to provide a drill collar retriever apparatus in a wash-over pipe which may be disengaged without mechanically lowering disconnecting tools in an oil well bore.

And still another object of this invention is to preclude accidental disengagement of the retrieving portion of the fishing tool prior to a positive connection of the retrieving tool with the lost drill collar, thereby preventing any possibility of accidental dropping of the retrieving apparatus and fish until it is lowered to the bottom of the well for disconnection.

And still an additional object of this invention is to provide a fishing tool having a combined reaming and retrieving apparatus wherein the action of the reaming tool is precluded prior to a positive engagement of the retrieving apparatus with the lost drill collar, thereby preventing any possibility of losing the fish by a primary reaming action tending to loosen the stuck drill collars and cause a dropping thereof to the bottom of the well bore.

Other objects and advantages of the invention will be evident from the following detailed description, read in conjunction with the accompanying drawings, which illustrate my invention.

In the drawings:

Figure 1 is a vertical sectional view of the upper portion of the improved drill collar fishing tool.

Figure 2 is a continuation of Fig. 1 illustrating a media portion of the fishing tool apparatus.

Figure 3 is a continuation of Fig. 2 illustrating a lowermost portion of the fishing and retrieving apparatus.

Figure 4:
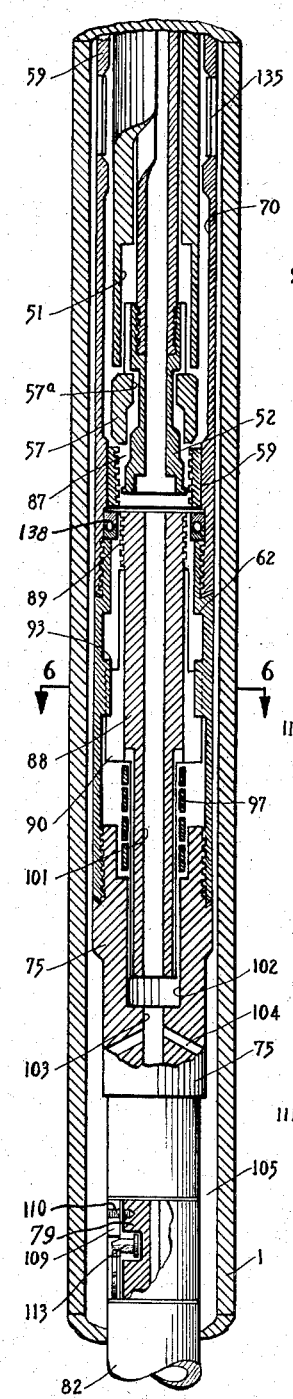
Figure 4 is a vertical sectional elevational view of a portion of the apparatus illustrated in Fig. 3 but showing the retrieving apparatus in position of disengagement from the coupling unit, certain elements are exaggerated in detail for purposes of clarity.

Referring to the drawings in detail, and particularly Figs. 1 to 4, reference character 1 designates a string of wash-over pipe having a tubular reamer 2 (Fig. 3) on the lower end thereof. The wash-over pipe 1 is suspended on the lower end of a string of drill pipe (not shown) which extends to the surface of the well bore (not shown). A slip joint (not shown), preferably of the type shown in my co-pending application Serial No. 390,994, filed November 9, 1953, now Patent No. 2,851,252, should be interposed between the drill pipe and wash-over pipe 1 to permit upward movement of the drill pipe independent of the wash-over pipe 1. Reference character 3 (Fig. 3) designates a drill collar lodged in the well bore and which the reamer 2 is to dislodge when utilizing the present invention.

A novel drill collar reaming and fishing mechanism is generally indicated at and shown extending through Figs. 1 to 3. The retrieving mechanism portion of the invention is inserted in the wash-over pipe 1 shortly above the reamer 2. The fishing mechanism comprises, in the main, a tubular mandrel, generally indicated at 4 and extending from the upper end through the major portion of the mechanism; a holding mechanism (Fig. 2), generally indicated at 5, for the purpose of slidably supporting the mandrel 4; a coupling unit 6; and a drill collar engaging and retrieving apparatus (Fig. 3) generally indicated at 7, at the lower end of the mechanism for engaging the drill collar 3.

The mandrel 4 is concentrically disposed in the wash-over pipe 1 and is constructed in several sections. The upper section 8 (Fig. 1) is provided with an enlarged head portion 9 having a downwardly and inwardly tapered bore 10 therethrough. A plurality of transverse apertures 11 extend through the walls of the section 8 slightly below the head 9, and a downwardly facing circumferential shoulder 12 is provided on the outer periphery of the section 8 below the apertures 11.

A tubular shaped orifice housing section 13 is threadedly secured to the lower end of the upper section 8 by a connector member 14. An upwardly extending circumferential flange 15 is formed on the upper end of the connecting member 14 to receive and support a packing unit 16. The flange 15 retains the packing unit 16 in tight contact with the outer periphery of the member 8 and against the shoulder 12. The packing unit 16 provides a fluid excluding seal between the mandrel section 8 and the inner periphery of the wash-over pipe 1 to prevent a downward flow of fluid around the mandrel 4 at this point, as will be more fully hereinafter set forth.

The orifice housing section 13 extends on downwardly from the section 8 and is threadedly secured at its lower end to another connecting member or collar 17. A tubular insert 18 is disposed in the collar 17 immediately below the housing section 13 and is retained in the collar 17 by the section 13. The insert 18 extends upwardly in the housing 13, and the inner surface thereof is tapered upwardly and outwardly at the upper end to form a seat 19. An orifice unit 20 is adapted to rest on the seat 19 and assist in the actuation of the mandrel 4. However, the orifice unit 20 is utilized only after the drill collar 3 has been engaged and dislodged, and is not present in the housing 13 at the beginning of the retrieving operation. Therefore, the detailed description of the unit 20, and a companion unit 21 will be deferred to a more appropriate place.

The collar 17 forms a threaded connection between the orifice housing section 13 and a lower tubular section 22 (Figs. 1 and 2) of the mandrel 4. In addition, the collar 17 is externally threaded near its lower end 23 to receive a sleeve or spring guide 24. The spring guide 24 depends from the collar 17 around the mandrel section 22 and has a plurality of transverse apertures 25 in the medial portion thereof for discharging circulating fluid, as will be hereinafter set forth. A helical spring 26 surrounds the mandrel section 22 inwardly of the spring guide 24 and is anchored at its upper end to an adjusting nut 27 threadedly secured to the section 22 immediately below the collar 17.

In the normal operating position of the spring 26, its lower end is substantially even with the lower end of the spring guide 24. It will be apparent that the mandrel section 29 extends concentrically through the holding apparatus 5, and the mandrel is provided with a central bore or aperture 100. The bore 100 communicates with the bore 101 in order that circulating fluid will travel through the apparatus and discharge out the lower end thereof adjacent the drill collars for assisting the loosening of the collars from the stuck condition in the recess.

The holding mechanism 5 comprises a tubular housing 30 having an inner diameter slightly larger than the outer diameter of the mandrel section 29, thereby providing a sliding fit between these two elements. An extension 31 is threadedly secured to the upper end of the housing 30 and extends upwardly around the mandrel sections 29 and 22. The upper end of the extension 31 provides an anchor for the lower end of the spring 26. The spring 26 has sufficient strength to support the mandrel 4 in the holding mechanism 5 and continually urges the mandrel 4 in an upward direction.

The lower end of the extension 31 forms a downwardly facing circumferential shoulder 34 to prevent upward movement of a slip shoe or head 35. The slip shoe surrounds the housing 30 and is keyed thereto by a key 36 to prevent rotation of the shoe 35. Downward movement of the shoe 35 is prevented by the key 36. A plurality of downwardly and inwardly tapered surfaces 37 are arranged in circumferentially spaced relation on the outer periphery of the shoe 35 to receive serrated slips 38. It will be apparent that the slips 38 will engage the wash-over pipe 1 upon downward movement of the shoe 35 and will be disengaged from the wash-over pipe 1 upon upward movement.

Links 39 interconnect the slips 38 with a dog cage 40 through pin type connections 41 at each end of the links 39. The dog cage 40 is tubular in construction and is secured to the outer periphery of the housing 30 by a key 42. The key 42 is loosely disposed in cooperating slots 43 formed in the housing 30 and dog cage 40 to provide a limited vertical movement of the dog cage 40. A plurality of vertical slots 44 are provided in the outer periphery of the dog cage 40 to receive dog members 45. The dogs 45 are radially movable to frictionally engage the wash-over pipe 1 and are constantly urged in an outward direction by small helical springs 46. Transverse pins 47 are secured in the dog cage 40 at each end of each slot 44 and extend through slots 48 in the opposite ends of the dogs 45 to limit the outward movement of the dogs 45.

The housing 30 extends downwardly below the dog cage 40 and has a helical spring 49 thereon resting on a circumferential shoulder 50. The spring 49 supports the dog cage 40 and assists in actuation of the slips 38, as will be hereinafter set forth. The coupling unit 6 is particularly disclosed in Fig. 3 and is provided for the control of releasing of the engaging and retrieving mechanism 7 from the holding mechanism 5, as will be hereinafter set forth. Referring to Fig. 3, it will be noted that a counter-bore 51 is formed in the lower portion of the housing 30 and contains a plunger 52. The plunger 52 is threadedly secured to the lower end 53 of the mandrel section 29 and is loosely disposed in the counter-bore 51. A shoulder 54 is formed on the lower end 53 of the mandrel section 29 of greater diameter than the bore of the housing 30. Thus, the shoulder 54 will contact the upper end of the counter-bore 51 and limit the upward movement of the plunger 52.

Figure 12:
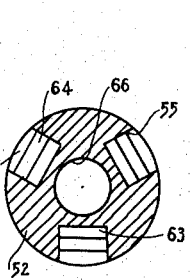
Figure 12 is a view taken on line 12—12 of Fig. 14.
Figure 13:
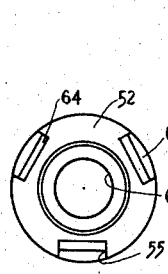
Figure 13 is a similar view at a different position thereof.
Figure 14:
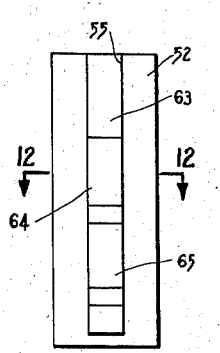
Figure 14 is a detail view of the control head.
Figure 10:
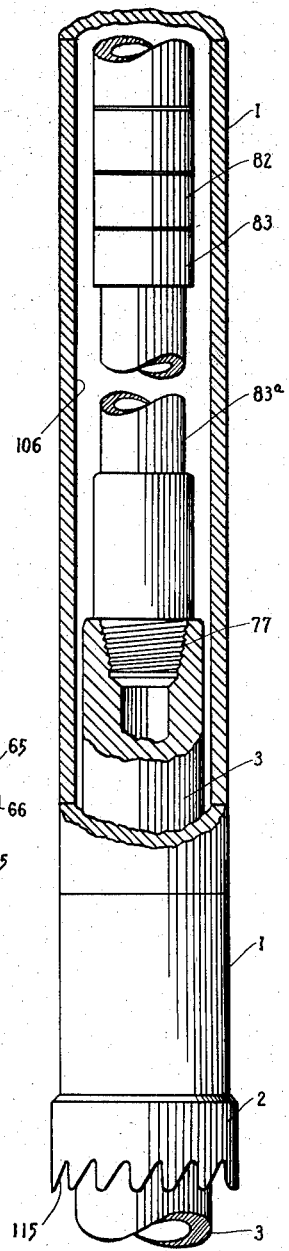
Figure 10 is a similar view of a lower extension of Fig. 9.

The plunger 52 is substantially circular in shape as is shown in Figs. 12 to 14. However, it is provided with a plurality of circumferentially spaced longitudinally extending slot members 55 in alignment with a plurality of circumferentially spaced pivotable dog members 57 carried in the vertically extending slots 56 of the outer mandrel sleeve 30. The longitudinal slots 55 are constructed with a plurality of variable depths as shown in Figs. 3 and 4 and which will be hereinafter referred to. The plunger 52 is provided with a central bore 58 communicating with the bore of the sleeve 29. The dogs are preferably circumferentially spaced in the slots 56 of the housing 30 circumferentially around the counter-bore portion 51 and are adapted to be moved radially in the slots 56 for engagement with a sleeve 59 of the drill collar engaging mechanism, or retrieving mechanism 7 as will be hereinafter set forth. An inwardly extending shoulder 60 is formed on the upper end of each of the pivotable dogs 57 to cooperate with the plunger in a manner as will be hereinafter set forth. The outer sleeve 59 extends below the plunger 52 and is threadedly engaged at 61 to an outer spline sleeve 62. Thus, the control coupling unit 6 comprises the plunger 52 and its complementary components, including the dogs 57, which cooperate to control the releasing operation as will be hereinafter set forth.

Alluding to the previously mentioned piston slots 55, from Figs. 3, 12, 13 and 14 it will be noted that the slots are of variable depths wherein the upper portion of the piston is of smaller diameter providing an increased slot depth 63 communicating with a portion of less depth at 64, in turn communicating with a lower slot portion 65 of further decreased or lesser depth, thereby providing variable shoulder and depth portions within the circular spaced slot members 55. The bore 58 of the plunger 52 is of increased diameter at 67 and provides a circular flange portion 68 at the lowermost end thereof.

It will be noted that the outer sleeve is provided with a circular recessed portion 70 disposed substantially adjacent the vertical position of the plunger 52 for a purpose as will be hereinafter set forth. It will be apparent that the dogs 57 disposed in the recess 70 provide for a floating or swivel connection with the outer sleeve 59. Inwardly projecting circular shoulders 71 are provided adjacent the uppermost portion of the circular recess 70, and the sleeve 59 is provided with a plurality of circumferentially spaced longitudinal grooves or slots 73 as is clearly shown in Fig. 3. The sleeve portion above the groove portion 73 is provided with internal threads 74 for a purpose as will be hereinafter set forth.

The outer spline sleeve 62 is disposed within the wash pipe 1 below the connecting sleeve 59 and extends downwardly for connection at 76 with the lower bottom sub or sleeve 75. The sub 75 in turn is connected through a pin and box unit 77 with a connecting sleeve member 78 provided with a downwardly extending sleeve or neck portion 79 of reduced diameter providing a circular shoulder portion 80. The reduced sleeve 79 is provided with threads 81 for connection with a lower sub 82 in turn connecting with a sleeve 83 through a pin and box member 84. The connecting sleeve 83 in turn is connected with the lost fish or drill collar 3 through suitable pin and box unit 85 (Fig. 3). The pin and box 85 is provided with standard right hand threads to permit easy connection and disconnection with the lost drill collar 3.

An inner spline sleeve 88 is disposed within the outer spline sleeve 62, and the upper portion of the inner spline sleeve 88 is provided with threads 89 meshing with complementary threads on the lower end of the housing sleeve 30. The cooperating threads 89 between the inner spline sleeve 88 and the tubular housing 30 are left hand threads for a purpose as will be hereinafter set forth. In the above manner there is provided a positive connection and release between the coupling unit 6 and the retrieving mechanism 7 in that the housing sleeve 30 connects with the inner spline sleeve 88 through the left hand threads 89, and the cooperating outer spline sleeve 62 connects with the outer sleeve 59 through the threaded connection 61.

Figure 11:
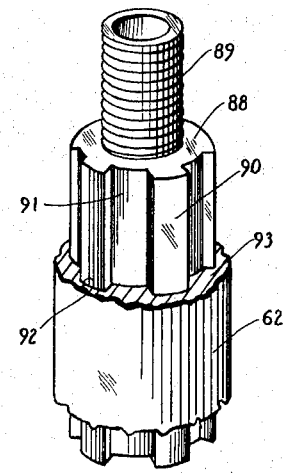
Figure 11 is a perspective view showing a detail of the spline members.

The inner spline sleeve 88 is provided with a plurality of circumferentially spaced projections or dogs 90 interposed with longitudinal grooves or slots 91. The outer spline sleeve 62 is provided with a plurality of circumferentially spaced longitudinal slots, or female splines 92 (Fig. 6) interposed with a plurality of projections or dogs 93. It will be apparent from Figs. 3 and 6 that there is a slidable connection between the inner spline sleeve 88 and the outer spline sleeve 62 with the dogs 90 of the sleeve 88 slidably disposed in the slots 92 of the outer sleeve 62, and in similar manner, the dogs 93 are slidably disposed in the grooves 91 of the inner sleeve 88. However as shown in Fig. 11, the spline portions of the outer sleeve 62 are of shorter length than those of the complementary spline portions for the inner sleeve 88. In Fig. 11, the upper portion of the outer spline sleeve showing the connection at 61 with the sleeve 59 is omitted for purposes of clarity.

The inner spline sleeve 88 is reduced in diameter to provide a lower neck or sleeve portion 94 providing a shoulder 95. The neck 94 extends into a chamber, or bore 96 of the sub member 75 connected at 76 to the outer spline sleeve 62, all disposed within the wash-over pipe 1. A helical spring 97 is anchored between the shoulder 95 and a shoulder 98 provided by the increased diameter portion 99 of the sub 75 for a purpose as will be hereinafter set forth.

Figure 5:
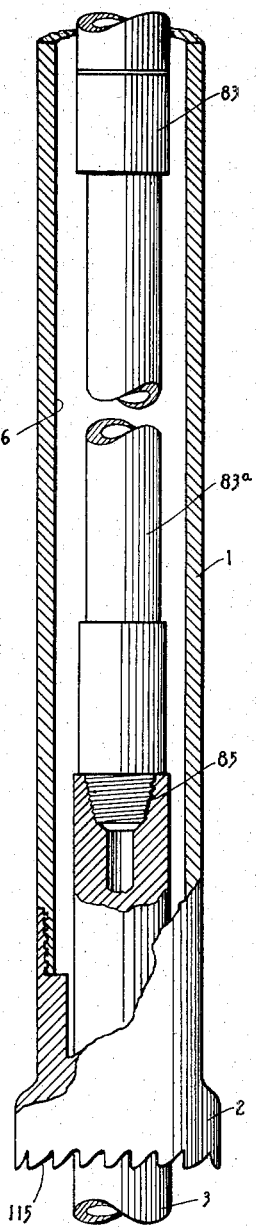
Figure 5 is a continuation of Fig. 4 with certain parts in elevation and showing the lowermost arrangement of the connecting elements beneath the retrieving apparatus as the reamer moves vertically downward.

It will be apparent that the fluid circulates throughout the device through communicating and aligned bores from the tubular mandrel 4 and the bore 100 (Fig. 2) in the sleeve 29 communicating with the bore 58 of the plunger 52 in turn communicating with an apertured bore 101 of the spline sleeve 88 communicating with a bore 102 of the sub 75. The bore 102 is reduced in diameter at 103 (Fig. 4) for communication with angled passageways 104 communicating with an annulus 105 provided between the sub 75 and the wash pipe 1. The annulus 105 continues through passageways 106 (Figs. 5 and 6) providing fluid circulation through the fishing apparatus and outwardly from the reaming shoe 2 for assisting the loosening of the drill collars in a well known manner. In similar manner, the connecting sleeve member 78 (Fig. 3) is provided with a communicating and aligned bore 107 in turn communicating with a bore 108 of the connecting sleeve 83 for fluid communication through the interior of the fishing apparatus and to the drill collar 3.

Figure 7:
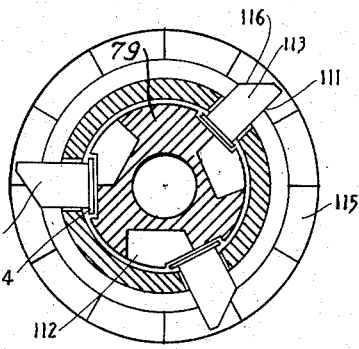
Figure 7 is a view taken on line 7—7 of Fig. 3, showing one position of the radial directed dogs.

A holding dog sleeve 109 is disposed around the reduced spline neck 79 and secured thereto by a plurality of circumferentially spaced shear pins 110 provided in aligned apertures between the sleeves 79 and 109. The reduced extension sleeve 79 is provided with a plurality of circumferentially spaced longitudinal slots 111, preferably three (but not limited thereto). Each slot 111 communicates with a recessed portion 112 of a greater area and increased depth and provided in the reduced neck portion 79 for a purpose as will be hereinafter set forth. A dog member 113 is disposed in each of the grooves 111 (Figs. 3, 7 and 8) and held therein by a circular flange 114 carried on the rear face of each of the dog members 113. The flange 114 is of a diameter greater than the width of the slots 111 to hold the dogs therein and is disposed in a portion 112ª of the recess 112 permitting slidable movement in the grooves 111. The dogs 113 normally extend radially outward through the apertures or slots 111 into engagement with the tapered sides of the teeth 115 of the reaming shoe 2. The outer end of the dogs 113 is provided with a tapered surface 116 cooperating with the tapered teeth 115 for a purpose as will be hereinafter set forth. The holding dog sleeve 109 in addition is held in vertical placement around the reduced neck portion 79 by the shouldered abutment 117 of the sub member 82 (Figs. 3 and 4).

Figure 8:
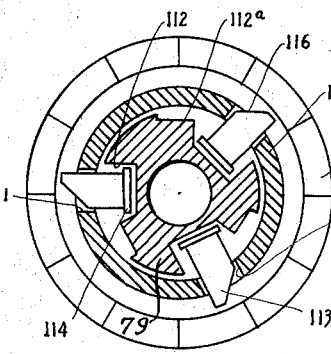
Figure 8 is a view similar to Fig. 7 showing another position of the dog elements.

The sleeve 109 is normally held in a stationary vertical position in cooperation with the dog 113 by engagement with the teeth 115 of the shoe 2 (Fig. 3). However, upon independent rotation of the sleeve 78 by simultaneous rotation of the mandrel 4, coupling unit 6, and retrieving apparatus 7, the reduced neck 79 is rotated causing a shearing of the pins 110, thereby providing a separate and independent rotation of the reduced neck 79 relative to the sleeve 109 moving the larger recess 112 adjacent to or in alignment with the flanges 114 of the lugs 113 (Fig. 8). With the larger recesses 112 in alignment as shown in Fig. 8, continued rotation of the wash-over pipe 1 and the reaming shoe 2 will cause the tapered teeth 115 thereof to move against the tapered ends 116 of the dogs 113, thereby moving them radially inwardly into the deeper recesses 112 for disengaging the dogs 113 from the teeth 115 of the reaming shoe 2, and permit downward movement of the shoe. The purpose of having the radially expanding dogs 113 engaged with the teeth 115 of the reaming shoe is to assure that the connecting sleeves 78 and 83 will always be leading the downward movement of the reaming shoe 2, and thereby provide a connection with the lost fish 3 through the pin and box 85 prior to any reaming action of the shoe 2 around the lost collar 3. If the reamer shoe 2 would be permitted to ream the key-seat formation around the stuck drill collar prior to a positive connection with the connecting portion of the retrieving apparatus, the drill collars may become loose and drop to the bottom of the well bore and cause considerable damage to the drilling apparatus. With the radially expanding lugs 113 preventing downward movement of the reamer shoe 2, the retrieving apparatus 7 is also prevented from being moved vertically upward inside the wash pipe 1 for any reason, whereupon the reamer would be disposed ahead of the connecting sleeve 83 prior to any connection with the lost fish 3. The expanding lugs 113 hold the reamer shoe 2 in a trailing position relative to the retrieving apparatus 7 until there is a positive connection at 85.

It will be apparent that the retrieving mechanism 7 through sleeve 59 downwardly to the connecting sleeve 83 is positively connected and upon engagement of the lowermost connecting sleeve 83 through the pin and box connection 85 with the stuck collar 3, there is provided a stationary apparatus that cannot rotate. However, the coupling unit 6 through the mandrel 29, sleeve 30, dogs 57 and plunger 52 are capable of rotation through rotative operation of the mandrel 4. It will be understood that the whole coupling unit 6 through engagement of the slips 35 and friction dogs 45 with the wash pipe 1 during a lowering of the tool and wash pipe into the well bore are rotating simultaneously therewith, and will continue to rotate until the pin and box connection 85 is connected with the lost drill collar or fish 3. After connection with the fish 3, the retrieving apparatus becomes a non-rotating, or stationary unit, while the wash-over pipe 1 and the coupling unit 6 including the dogs 57 and the plunger 52 continue to rotate with the wash-over pipe 1.

Operation

To recover a lodged drill collar or fish 3 from a key-seated well bore, the wash-over pipe 1 having the reamer shoe 2 attached to the lower end thereof, and the holding, coupling and retrieving apparatuses 5, 6, and 7, respectively, disposed in the pipe 1 above the reamer 2 are all lowered into the well bore. When the holding apparatus is inserted in the wash-over pipe 1, the friction dogs 45 (Fig. 2) will engage the inner periphery of the wash-over pipe 1 and support the entire apparatus thereabove. Furthermore, the spring 26 will exert an upward force on the mandrel 4 to retain the plunger 52 in its uppermost position (Fig. 3) with the flange 54 in contact with the upper shouldered end of the counterbore 51. The lowermost and larger diametered portion 65 of the plunger 52 will be in contact with the dogs 57, thereby maintaining them in engagement with the inner periphery of the sleeve 59 for supporting the drill collar retrieving and connecting apparatus 7.

As previously noted, the orifice units 20 and 21 are not disposed in the orifice housing section 13 of the housing mandrel 4 at this time. The entire wash-over string, comprising the wash-over pipe 1 and the drill string interconnected by a slip joint (both not shown) are lowered and rotated in the well bore to provide a reaming action of the mill shoe 2 for the removal of all key-seats existing in the well bore normally preventing removal of lodged drill collars. Simultaneously with the lowering operation of the wash-over string, circulating mud, such as drilling fluid, is pumped downwardly through the entire wash-over string in order to remove cuttings produced by the reamer 2, and wash the cuttings upwardly in the annulus (not shown) between the wash-over string and the well bore. The circulating fluid enters the mandrel 4 through the tapered bore 10 (Fig. 1) and a portion thereof discharges outwardly through the apertures 11 and downwardly around the head 9 to force the packing unit 16 outwardly, providing a seal with the wash-over pipe 1. The remainder of the circulating fluid discharges through the sections 8, 13 and 22 of the mandrel 4 and a portion thereof flows outward through the slots 28 and 32 (Fig. 2) into the annulus 33 and downwardly around the retrieving apparatus 7 for flushing around the reamer shoe 2. The remainder of the circulating fluid discharges through bores 100, 58, 101, 102, 103, 111 and into the drill collar 3 to assist in dislodging the collar from its lodged condition.

The radial expanding dogs 113 engaging the tapered teeth 115 of the shoe 2 maintain the reamer shoe 2 above the connecting sub 83 during the lowering of the apparatus in the well. However, rotation of the entire apparatus will thread the sleeve 83 by the pin and box unit 85 into connection with the lodged drill collar 3. As soon as the threaded connection is made with the lost collar 3, the entire apparatus is precluded from further movement in a downward direciton, but continued rotation of the wash-over pipe will move the radial expanding lugs 113 out of contact with the teeth 115 and permit continued downward rotation and movement of the reamer shoe 2 to provide a cutting and reaming action around the lodged drill collar 3. As the wash-over pipe 1 moves downward, it will exert a downward force on the friction dogs 45 to cause a disengagement of the slips 38 through the links 39. The rotative and downward movement of the wash-over pipe 1 is continued until the drill collar is dislodged through the reaming action of the rotating shoe 2, whereupon the drill collar 3 will attempt to fall to the bottom of the well bore. The downward force caused by the initial downward movement of the drill collar 3 is transmitted through the threaded pin and box 85, connector sleeves 83, 78, 75, 62, 59, dogs 57, housing sleeve 30 to the slip shoe 35. Normally the friction dogs 45 will tend to remain approximately even with the movement of the wash-over pipe 1, and thus are urged upwardly by the helical spring 49. Consequently, upon the dislodging of the drill collar 3, the downward thrust will cause the shoe 35 to move downwardly within the slips 38 where the tapered surfaces therebetween will expand them into engagement with the wash-over pipe 1. It will be apparent that the engagement of the slips 38 with the wash-over pipe is substantially contemporaneous with the loosening of the lodged drill collars 3, and upon the slips becoming engaged, the drill collar 3 is effectively engaged to the wash-over pipe 1 and prevented from further downward movement in the well bore.

If the key-seat has been reamed sufficient to permit passage of the dislodged drill collar, the entire wash-over string with the drill collar 3 secured at the end thereof may be removed therefrom. However, if it is not deemed expedient to remove the drill collar with the present retrieving apparatus 7, the entire wash-over string may be lowered to the bottom of the well bore for disposition of the drill collar 3 thereon, whereupon the retrieving apparatus 7 may be separated from the coupling unit 6 to permit separate removal of the wash-over string. In this manner, a separate and independent fishing apparatus may be inserted in the bore for removing the drill collar.

Separation of the retrieving apparatus 7 is accomplished hydraulically through the use of the orifice unit 20 (Fig. 1). The unit 20 comprises a tubular plug 120 having a lower tapered end 121 for cooperation with a tapered seat 122. A sealing ring 123 is countersunk on the tapered end 121 to provide a seal to the seat 122 and preclude flow of circulating fluid around the plug 120. The inner bore 124 of the plug 120 is partially threaded to receive a threaded bushing 125 and a tubular extension 126. A frangible solid disc 127 is shown disposed in the plug 120 but may not be originally utilized as will be hereinafter set forth. The upper inner end of the extension 126 is tapered inwardly and downwardly to provide a seat 128 for the orifice unit 21. The remaining length of the inner bore of the extension 126 is slightly tapered, but to a much lesser extent for receiving an orifice plate 129. It will be apparent that the orifice plate 129 is wedged into the extension 126 and that the plate 129 will restrict the flow of circulating fluid through the mandrel 4.

*Releasing operation*

When it is desired to separate the engaged retrieving apparatus 7 from the holding apparatus 5 and the remaining portion of the wash-over string, it is necessary to disjoint the retrieving mechanism 7 at the threaded connection 89 between the inner spline sleeve 88 and the rotatable housing sleeve 30. It will be apparent that with the threaded connection 89 maintained, the inner spline sleeve 88 is conterminous with the bottom face of the plunger 52. Consequently, the plunger 52 cannot be moved downwardly by any action of the coupling unit 6 and thereby cause an accidental movement of the pivotable dogs 57 and a consequent accidental release of the sleeve 59 prior to a make up connection through the pin and box unit 85 of the retrieving apparatus 7 with the lost fish 3.

Figure 6:
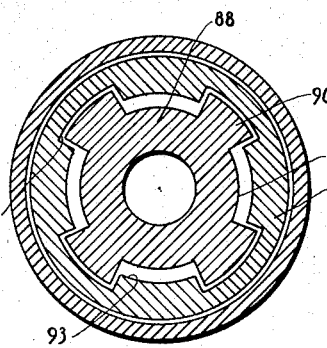
Figure 6 is a view taken on line 6—6 of Fig. 4.

After the retrieving apparatus 7 is tightly engaged with the lost fish 3, and rotation of the reamer shoe teeth 115, the sleeve 79 shears the pins 110 providing alignment of the dogs 113 with the recesses 112 for radial movement inwardly permitting downward movement of the reamer shoe around the lost fish. In this condition, the engaged retrieving apparatus 7 is stationary, but the coupling unit 6 and the housing sleeve 30 will be rotated in a right hand direction with any continued rotation of the wash-over pipe 1. Consequently upon rotation, the housing 30 is unthreaded by the left hand threads 89 for releasing the inner spline sleeve 88 from any connection with the housing 30. The inner spline sleeve 88 is maintained stationary during the back off of the left hand threads 89 through the cooperating male and female splines 90 and 93 (Figs. 6 and 11). As soon as the sleeve 30 is disconnected from the inner spline sleeve 88, the sleeve 88 is permitted to slide downwardly in the outer spline 62 against the action of the spring 97 into the bore 102 of sub 75 (Fig. 4), thereby moving the top of the inner sleeve 88 away from the bottom of the plunger 52 and providing clearance of chamber 87 permitting operation of the plunger 52 into a released position to cause pivotable movement of the latching dogs 57 as will now be set forth. The tension of the spring 97 during the unthreading movement is not sufficient to overcome the downward movement of the spline sleeve 88 combined with the rotating movement of the wash-over pipe 1 and the housing sleeve 30.

After the retrieving mechanism 7 is disengaged at the left hand threaded connection 89, the orifice unit 20 is pumped down through the wash-over string by the circulating fluid and comes to rest on the seat 122. Continued pumping of the circulating fluid causes an increase of fluid pressure above the orifice plate 129 due to the decreased aperture therethrough. Consequently, the pressure on the mandrel 4 is increased until enough force is built up to overcome the action of the spring 26; whereupon the mandrel 4 moves downwardly through the holding mechanism 5. As shown in Fig. 4, through this action the plunger 52 is thereby moved downwardly to move the intermediate portion 64 of lesser diameter of the plunger 52 below the shoulders 57a of the dogs 57. The dogs 57 are then free to move inwardly out of engagement with the sleeve 59, and thereby free the drill collar retrieving and engaging mechanism 7 from the control mechanism 6. After the plunger 52 is moved downwardly (Fig. 4), an upward pull is exerted on the wash-over string and with the dogs 57 in released position they will not exert any appreciable force on the sleeve 59, therefore the housing sleeve 30 may move upwardly through the sleeve 59. Furthermore, as the housing sleeve 30 is being moved upwardly through sleeve 59, the circular shoulders 71 will contact the dogs 57 and move them inwardly into the counter-bore 51 in contact with the plunger 52. The wash-over string including the pipe 1 and attendant apparatus encased therein is then free for removal from the well bore, leaving the drill collar 3 and engaged retrieving apparatus 7 at the bottom of the well bore. The threaded portion 74 is then free for engagement by other recovery tools which may be inserted in the well bore for recovering the drill collar 3.

The circulating fluid has a tendency to harden around the reamer shoe 2, and at times may restrict the flow through the fishing apparatus. When such a condition occurs, it may be difficult to build up sufficient pressure on the mandrel 4 to compress the spring 26 by using only the orifice plate 129. Consequently a frangible solid disc 127 may be secured in the plug 120 and the disc will prevent the flow of fluid through the mandrel 4 until an appreciable pressure is built up above the orifice unit 20 to compress the spring 26; whereupon the disc 127 will rupture and permit further flow of fluid through the retriever 7 and prevent hardening of the fluid therein. A similar orifice unit 21 having an orifice plug 131 and frangible disc 132 may be pumped down on the seat 128 if additional, or increased pressure for compressing the spring is necessary. The orifice plug 131 is preferably provided with a smaller aperture or recess than the plug 129 for decreasing flow of fluid therethrough.

Figure 9:
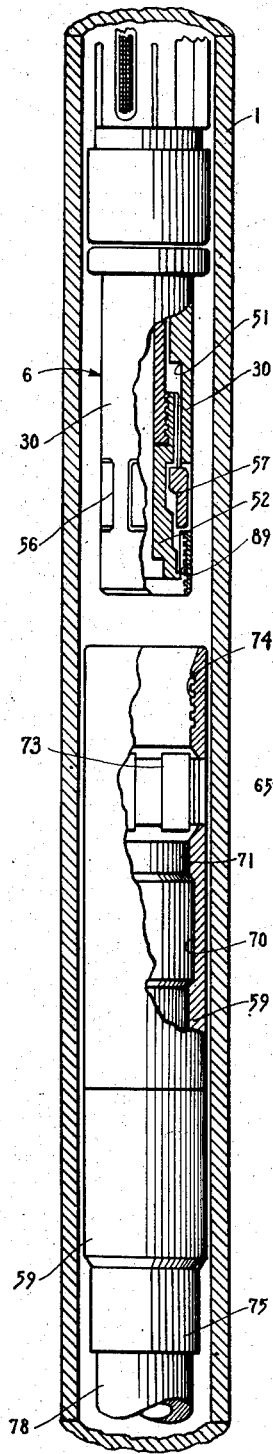
Figure 9 is a vertical sectional view with certain parts in elevation showing an arrangement for re-engaging the disconnected retrieving mechanism with the coupling unit for disengaging the retrieving apparatus from the drill collar.

In Fig. 9 the outer sleeve 59 of the retrieving apparatus is shown in disengaged position from the coupling unit 6. Figure 9 shows the sleeve 59 disposed away from a vertical position adjacent the plunger 52 and with the longitudinal grooves or slots 73 more clearly shown. The slots 73 are preferably disposed in complementary alignment to that of the pivotal dogs 57. When it is desired to re-engage the released retrieving mechanism 7 previously connected with the lost fish 3, the coupling unit 6 is lowered, bringing the dogs 57 into alignment with the slots 73 which may be accomplished because of the swivel connection. Upon alignment with the slots 73, the dogs 57 are forced by the main spring 26 into the slots 73, thereby providing a positive interlock between the coupling unit 6 and the retrieving mechanism 7 in order that the retrieving unit 7 may be unthreaded from the pin and box unit 85 for disengagement of the unit from the lost fish 3. Such release of the retriever 7 may become necessary if there is a partial loosening between the pin and box unit 85 causing some rotation of the fish 3 tending to have a loosening effect thereon. The slots 73 permit an interlock between the coupling unit and the retrieving mechanism for removal of the retrieving apparatus 7 from the fish, if ever need be.

It will be apparent that the connecting sleeve 83 is provided with a smaller diameter pipe 83a which may be of any substantial length as desired, but has been shown broken in the various figures for purposes of clarity. In Fig. 3, an anti-friction annular bearing member 138 is interposed between the threaded connections of the spline sleeves.

From the foregoing, it will be apparent that the present invention provides a novel fishing tool apparatus wherein lodged drill collars and the like may be dislodged from a key-seated well bore, and contemporaneously prevented from falling to the bottom of the well bore so that they may be retrieved from the bore. The drill collars are engaged by the fishing apparatus prior to any initial reaming operation for removal of a key-seat, thereby assuring engagement of the drill collars for removal from the well bore. Furthermore, the drill collar engaging mechanism cannot be releasably disconnected from the fishing apparatus until there is a positive connection between the drill collar engaging mechanism and the drill collars to be retrieved, thereby preventing any possibility of accidental disengagement of the engaging mechanism that may become loose and lost in the well bore. In addition, the fishing apparatus contemplates a positive connection of the drill collar engaging mechanism with the lodged drill collars prior to a loosening action of the reaming shoe of the key-seat in order to preclude any possible loosening of the drill collar prior to a connection between the engaging mechanism and the collars.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A fishing apparatus for retrieving stuck drill collars in a well bore comprising a string of wash-over pipe of a size adapted to be inserted in the well bore and telescoped over the drill collars, a reaming shoe on the lower end of the wash-over pipe, a tubular mandrel disposed within the wash-over pipe, a friction holding mechanism slidably supporting the tubular mandrel within the wash-over pipe, a drill collar retrieving apparatus disposed within the wash-over pipe for engaging the stuck drill collar, a coupling unit interposed between the mandrel and the retrieving apparatus for releasable coupling therebetween, said coupling unit comprising a plunger provided in the coupling unit, a slotted sleeve provided in the holding mechanism and around the plunger, a recess provided in the retrieving apparatus adjacent the slotted portions of the holding mechanism, a set of pivotal dogs disposed in the slots of the holding mechanism sleeve and adjacent the recess portion of the retrieving apparatus to interconnect the retrieving apparatus with the mandrel, said plunger connected to the mandrel for simultaneous movement therewith in one direction to permit pivotal movement of the dogs out of contact with the retrieving apparatus for releasing the retrieving apparatus from the mandrel, and sleeve means providing threaded connection between the coupling unit and the retrieving apparatus, said sleeve means in abutment with the plunger to preclude movement thereof for release of the retrieving apparatus until the retrieving apparatus is in connecting engagement with the drill collars.

2. A combined fishing and reaming apparatus for retrieving lodged drill collars in a well bore comprising an outer housing of a size to be inserted in the bore and telescoped over the collars, a tubular reamer on the outer end of the housing, holding mechanism in the housing, a drill collar engaging mechanism disposed in the housing, coupling means carried by the holding mechanism for releasably connecting the drill collar engaging mechanism with the housing, threaded sleeve means interconnecting the coupling means and the drill collar engaging mechanism for precluding actuation of the coupling means for disconnecting the drill collar engaging mechanism from the housing prior to a positive connection of the drill collar engaging mechanism with the drill collars.

3. A combined fishing and reaming apparatus for retrieving lodged drill collars in a well bore comprising an outer housing of a size to be inserted in the bore and telescoped over the collars, a tubular reamer on the outer end of the housing, holding mechanism in the housing, a drill collar engaging mechanism disposed in the housing, coupling means carried by the holding mechanism for releasably connecting the drill collar engaging mechanism with the housing, threaded sleeve means interconnecting the coupling means and the drill collar engaging mechanism for precluding actuation of the coupling means for disconnecting the drill collar engaging mechanism from the housing prior to a positive connection of the engaging mechanism with the drill collar, and radially extending dog means carried by the drill collar engaging mechanism for cooperation with the reamer to maintain the housing and reamer above the leading end of the drill collar engaging mechanism prior to a connection of the drill collar engaging mechanism with the drill collars.

4. A combined fishing and reaming apparatus for retrieving lodged drill collars in a well bore comprising an outer housing of a size to be inserted in the bore and telescoped over the collars, a tubular reamer on the outer end of the housing, holding mechanism in the housing, a drill collar engaging mechanism disposed in the housing, coupling means carried by the holding mechanism for releasably connecting the drill collar engaging mechanism with the housing, threaded sleeve means interconnecting the coupling means and the drill collar engaging mechanism for precluding actuation of the coupling means for disconnecting the drill collar engaging mechanism from the housing prior to a positive connection of the drill collar engaging mechanism with the drill collars, said drill collar engaging mechanism comprising a sleeve member having a plurality of longitudinally disposed grooves therein, recessed portions communicating with the grooves, radially extending dog members disposed in the grooves and engageable with the reamer to maintain the reamer above the leading end of the drill collar engaging mechanism prior to a connection of the drill collar engaging mechanism with the drill collars, and means cooperating with the reamer and the sleeve member upon connection of the drill collar engaging mechanism with the drill collars to move the dogs inwardly into the recessed portions for releasing the reamer therefrom.

5. A combined fishing and reaming apparatus for retrieving lodged drill collars in a well bore comprising an outer housing of a size to be inserted in the bore and telescoped over the collars, a tubular reamer on the outer end of the housing, holding mechanism in the housing, a drill collar engaging mechanism, coupling means carried by the holding mechanism for releasably connecting the drill collar engaging mechanism with the housing, threaded sleeve means interconnecting the coupling means and the drill collar engaging mechanism for precluding actuation of the coupling means for disconnecting the drill collar engaging mechanism from the housing prior to a positive connection of the drill collar engaging mechanism with the drill collar, radially extending dog means provided on the drill collar engaging mechanism for cooperation with the reamer to maintain the housing and reamer in a trailing position to the leading end of the drill collar engaging mechanism prior to a connection with the drill collars, and means cooperating with the reamer and responsive to the continued rotative movement of the outer housing upon connection of the drill collar engaging mechanism with the lodged drill collar for radially contracting the dog means for releasing the reamer to permit continued downward movement of the reamer in the well bore.

6. A combined fishing and reaming apparatus for retrieving lodged drill collars in a well bore comprising a wash-over pipe of a size to be inserted in the well and telescoped over the collar, a tubular reamer on the lower end of the pipe having a plurality of angled teeth thereon, a drill collar engaging mechanism partially disposed in the wash-over pipe, friction holding means disposed in the wash-over pipe for slidably connecting the drill collar engaging mechanism with the pipe, coupling means carried by the friction holding means for releasably connecting the drill collar engaging mechanism thereto, telescoping splined sleeves interposed between the coupling means and the drill collar engaging mechanism, connecting means provided between one of said splined sleeves and the coupling means to preclude actuation of the coupling means prior to a connection of the drill collar engaging mechanism with the drill collars.

7. A combined fishing and reaming apparatus for retrieving lodged drill collars in a well bore comprising an outer housing of a size to be inserted in the bore and telescoped over the collars, a tubular reamer on the outer end of the housing, holding mechanism in the housing, a drill collar engaging mechanism, coupling means carried by the holding mechanism for releasably connecting the drill collar engaging mechanism with the housing, connecting means interposed between the coupling means and the drill collar engaging mechanism for precluding actuation of the coupling means for disconnecting the drill collar engaging means from the housing prior to a positive connection of the drill collar engaging mechanism with the drill collars, said connecting means comprising inner and outer telescoping sleeve members having cooperating male and female splines, said inner sleeve provided with a threaded connection with the coupling means to preclude actuation of the coupling means prior to a connection of the drill collar engaging mechanism with the drill collars.

8. A combined fishing and reaming apparatus for retrieving lodged drill collars in a well bore comprising a wash-over pipe of a size to be inserted in the well and telescoped over the collars, a tubular reamer on the lower end of the pipe having a plurality of angled teeth thereon, a drill collar engaging mechanism partially disposed in the wash-over pipe, friction holding means disposed in the wash-over pipe for slidably connecting the drill collar engaging mechanism with the pipe, coupling means carried by the friction holding means for releasably connecting the drill collar engaging mechanism thereto, telescoping splined sleeves interposed between the coupling means and the drill collar engaging mechanism, connecting means provided between one of said spline sleeves and the coupling means to preclude actuation of the coupling means prior to a connection of the drill collar engaging mechanism with the drill collars, and radially expanding means provided on the drill collar engaging mechanism adapted to engage the angled teeth of the reamer to preclude movement of the reamer below the leading edge of the drill collar engaging mechanism prior to any connection thereof with the drill collars.

9. An apparatus for retrieving drill collars lodged in a well bore, comprising a wash-over string of a size to enter the well bore and telescope over the drill collars, a reamer on the lower end of the wash-over string to dislodge the drill collars, drill collar engaging means partially disposed in the wash-over string, tubular shaped friction holding means in the lower portion of the wash-over string for supporting the drill collar engaging means in the wash-over string, mandrel means extending through the friction holding means and movable relative thereto, an orifice unit disposed within the wash-over string above the mandrel for downward movement under fluid pressure for imparting downward movement to the mandrel, spring means on the friction holding means and engaging the mandrel means and resisting movement of the mandrel means in one direction, coupling means carried by the mandrel means for releasably securing the drill collar engaging means to the friction holding means, telescoping spline sleeves interposed between the coupling means and the drill collar engaging means, and left hand threads connecting one of said spline sleeves and the coupling means to preclude actuation of the coupling means prior to a connection of the drill collar engaging means with the drill collars.

10. A drill collar retrieving apparatus for use in a wash-over pipe having fluid flowing downwardly therethrough, comprising a drill collar engaging section, a holding section normally telescopically arranged with the drill collar engaging section, friction means on the holding section arranged to engage the inner periphery of the wash-over pipe, slips carried by the holding section arranged to engage the inner periphery of the wash-over pipe when a downward force is applied to the holding section, fluid actuated coupling means interposed between the holding section and the drill collar engaging section for releasably interconnecting the drill collar engaging section and the holding section, telescoping spline sleeves interposed between the fluid actuated coupling means and the drill collar engaging section, and left hand threads connecting one of said spline sleeves with the coupling means to preclude actuation of the coupling means for releasing of the drill collar engaging section prior to a connection of the drill collar engaging section with the drill collars.

11. A combined fishing and reaming apparatus for retrieving lodged drill collars in a well bore comprising a rotating wash-over string of a size to be inserted in the well and telescoped over the collars, a toothed reamer on the lower end of the wash-over string, a drill collar engaging mechanism disposed partially within the wash-over string, friction holding means disposed in the wash-over string for slidably securing the engaging mechanism therein, a drill collar connecting sleeve provided on the engaging mechanism and extending below the wash-over string during insertion thereof in the well bore, hydraulically actuated coupling means interposed between the friction holding means and the engaging mechanism and having a plunger cooperating with a plurality of pivotal dogs for releasably connecting the engaging mechanism thereto, inner and outer telescoping sleeve members having cooperating male and female splines interposed between the coupling means and the engaging mechanism, left hand threads connecting the inner splined sleeve to the coupling means for maintaining the upper face of the inner splined sleeve adjacent the under face of the plunger in order to preclude actuation of the plunger and pivotal dogs for releasing the engaging mechanism prior to a connection of the engaging mechanism with the drill collars, said left hand threads responsive to a continued rotation of the wash-over string in a right hand direction after connection of the engaging mechanism with the drill collars to cause a disconnection between the coupling means and the engaging means.

12. A combined fishing and reaming apparatus for retrieving lodged drill collars in a well bore comprising a rotating wash-over string of a size to be inserted in the well and telescoped over the collars, a toothed reamer on the lower end of the wash-over string, a drill collar engaging mechanism disposed partially within the wash-over string, friction holding means disposed in the wash-over string for slidably supporting the engaging mechanism therein, a drill collar connecting sleeve provided on the engaging mechanism and extending below the wash-over string during insertion thereof in the well bore, hydraulically actuated coupling means interposed between the friction holding means and the engaging mechanism and having a plunger cooperating with a plurality of pivotal dogs for releasably connecting the engaging mechanism thereto, inner and outer telescoping sleeve members having cooperating male and female splines interposed between the coupling means and the engaging mechanism, left hand threads connecting the inner splined sleeve to the coupling means for positioning the upper face of the inner splined sleeve adjacent the under face of the plunger to preclude actuation of the plunger and pivotal dogs for releasing the engaging mechanism prior to a connection of the engaging mechanism with the drill collars, said left hand threads responsive to a continued rotation of the wash-over string in a right hand direction after connection of the engaging mechanism with the drill collars to cause a disconnection between the coupling means and the engaging means, and radially expanding dogs provided on the engaging means adapted to contact the toothed reamer to preclude movement of the reamer below the leading edge of the connecting sleeve prior to a connection thereof with the drill collars.

13. A combined fishing and reaming apparatus for retrieving lodged drill collars in a well bore comprising a rotating wash-over string of a size to be inserted in the well and telescoped over the collars, a toothed reamer on the lower end of the wash-over string, a drill collar engaging mechanism disposed partially within the wash-over string, friction holding means disposed in the wash-over string for slidably securing the drill collar engaging mechanism therein, hydraulically actuated coupling means interposed between the friction holding means and the drill collar engaging mechanism and having a plunger cooperating with a plurality of pivotal dogs for releasably connecting the drill collar engaging mechanism thereto, inner and outer telescoping sleeve members having cooperating male and female splines interposed between the coupling means and the drill collar engaging mechanism, left hand threads connecting the inner splined sleeve to the coupling means for positioning the upper face of the inner splined sleeve adjacent the under face of the plunger to preclude actuation of the plunger and pivotal dogs for releasing the drill collar engaging mechanism prior to a connection of the drill collar engaging mechanism with the drill collars, said left hand threads responsive to a continued rotation of the wash-over string in a right hand direction after connection of the drill collar engaging mechanism with the drill collars to cause a disconnection between the coupling means and the drill collar engaging means, an outer sleeve for the drill collar engaging mechanism, a plurality of circumferentially spaced slots provided in the outer sleeve and in complementary alignment with the pivotal dogs permitting connection between the dogs and the slots upon actuation of the coupling means to provide a re-engagement of the released drill collar engaging means with the coupling means.

References Cited in the file of this patent

UNITED STATES PATENTS

| | | |
|---|---|---|
| 2,179,033 | Cashion et al. | Nov. 7, 1939 |
| 2,449,841 | Claypool et al. | Sept. 21, 1948 |
| 2,647,008 | Stewart et al. | July 28, 1953 |